United States Patent [19]

Kathawala

[11] 3,869,450
[45] Mar. 4, 1975

[54] S-TRIAZOLO (4,3-D) (1,4) BENZODIAZEPIN-6(7H)-ONES
[75] Inventor: Faizulla G. Kathawala, West Orange, N.J.
[73] Assignee: Sandoz-Wander, Inc., Hanover, N.J.
[22] Filed: June 18, 1973
[21] Appl. No.: 370,917

[52] U.S. Cl. .......................... 260/239.3 T, 424/269
[51] Int. Cl.. C07d 53/06, C07d 55/00, C07d 99/02
[58] Field of Search ............................. 260/239.3 T Primary Examiner—Henry R. Jiles
Assistant Examiner—Robert T. Bond
Attorney, Agent, or Firm—Gerald D. Sharkin; Richard E. Vila; Joseph J. Borovian

[57] ABSTRACT

S-triazolo[4,3-d][1,4]benzodiazepin-6(7H)-ones, e.g., 10-chloro-7-methyl-3-(o-chlorophenyl)-5H-s-triazolo[4,3-d][1,4]benzodiazepin-6(7H)-one are prepared from a corresponding 1,4-benzodiazepin-2-one, and are useful as anti-convulsants and minor tranquilizers.

7 Claims, No Drawings

S-TRIAZOLO (4,3-D) (1,4) BENZODIAZEPIN-6(7H)-ONES

This invention relates to s-triazolo[4,3-d][1,4]benzodiazepin-6-(7H)-one derivatives, acid addition salts thereof, intermediates and processes for their preparation and their use as anti-convulsants and minor tranquilizers.

The compounds of this invention may be represented by the following structural formula:

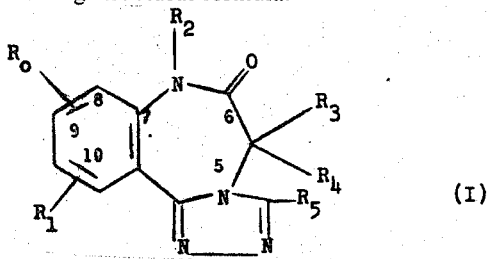

where:
- $R_0$ and $R_1$ each independently represent hydrogen, halo having an atomic weight of about 18 to 80, lower alkyl, i.e. alkyl having 1 to 4 carbon atoms, eg. methyl, ethyl, propyl, isopropyl and the like, nitro or trifluoromethyl provided that at least one $R_0$ and $R_1$ is halo, preferably chloro, when $R_2$ is hydrogen; and
- $R_2$ is hydrogen, lower alkyl as defined above; and
- $R_3$ is hydrogen, lower alkyl as defined above; unsubstituted phenyl or phenyl mono-substituted with halo having an atomic weight of 18 to 80, and
- $R_4$ is hydrogen, and
- $R_5$ is unsubstituted phenyl or phenyl mono-substituted or di-substituted with halo having an atomic weight of 18 to 80.

The compounds of formula (I) may be prepared by the following reaction scheme:

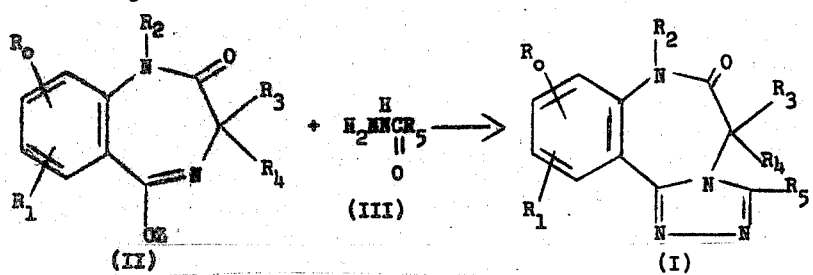

where Z is lower alkyl of 1 to 2 carbon atoms, and where $R_1$, $R_2$, $R_3$, $R_4$ and $R_5$ are as defined above.

The compounds of formula (I) are prepared by treating a compound of the formula (II) with an acylhydrazide of the formula (III) in an inert organic solvent such as ethers, e.g., diethyl-ether, glyme, di-glyme or tetrahydrofuran, preferably di-glyme. The reaction temperature is not critical, but it is preferred that the reaction be carried out between about 30° to 180°C, especially the reflux temperature of the solvent. The reaction is typically run from about 10 to 28 hours. The compounds of formula (I) may be recovered using conventional techniques, e.g, crystallization.

Certain of the compounds of formula (II) and (III) are known and may be prepared by methods disclosed in the literature. Those compounds of the formulae (II) and (III) not specifically disclosed may be prepared by analagous methods from known starting materials.

The compounds of formula (I) possess pharmacological activity. In particular they possess minor tranquilizer and anti-convulsant activity as indicated (1) by their ability to produce docility in behavior tests in mice given 50 to 250 mg/kg i.p. of the test compound according to the 30-word adjective check sheet system, basically described by S. Irwin Gordon Research Conference, Medicinal Chemistry, 1959 and Chem. Symposium on Sedative and Hypnotic Drugs, Williams and Williams 1954, and (2) by their ability to antagonize chronic convulsions and death in mice given 50 to 250 mg/kg, i.p. of the test compound followed one hour later by 50 mg/kg i.p. of N-sulfamoylazepine.

For such usage, the compounds of formula (I) may be administered orally or parenterally as such or admixed with conventional pharmaceutical carriers. They may be administered orally in such forms as tablets, dispersible powders, granules, capsules, syrups and elixirs, and parenterally as solutions e.g., a sterile injectable aqueous solution. The compositions for oral use may contain one or more conventional adjuvants, such as sweetening agents, flavoring agents, coloring agents and preserving agents, in order to provide an elegant and palatable preparation. Tablets may contain the active ingredient in admixture with conventional pharmaceutically acceptable exicpients, e.g., inert diluents, such as calcium carbonate, sodium carbonate, lactose, and talc, granulating and distintegrating agents, e.g., starch and alginic acid, binding agents, e.g., starch, gelatin and acacia, and lubricating agents, eg., magnesium stearate, steaic acid and talc. The tablets may be uncoated or coated by known techniques to delay disintegration and absorption in the gastrointestinal tract and thereby provide a sustained action over a longer period. Similarly, suspensions, syrups, and elixirs, may contain the active ingredient in admixture with any of the conventional excipients utilized for the preparation of such compositions, e.g., suspending agents (lecithin, polyoxyethylene stearate and polyoxyethylene sorbitan monoleate) and preservatives (ethyl-p-hydroxybenzoate). Capsules may contain the active ingredient alone or admixed with an inert solid diluent, e.g., calcium carbonate, calcium phosphate and kaolin. The injectable compositions are formulated as known in the art. All these pharmaceutical preparations may contain up to about 90% of the active ingredient in combination with the carrier or adjuvant.

Furthermore, the compounds of formula (I) may be similarly administered in the form of their non-toxic pharmaceutically acceptable acid addition salts. Such salts possess the same order of activity as the free base, are readily prepared by reacting the base with an appropriate acid and accordingly, are included within the scope of the invention. Representative of the acid addition salts are the mineral acid salts, such as the hydrochloride, hydrobromide, sulfate and phosphate and the like and the organic acid salts such as succinate, benzoate, acetate, p-toluenesulfonate, benzenesulfonate, and the like.

For the above use as a minor tranquilizer and an anti-convulsant, the dosage of compound (I) will vary depending upon the mode of administration utilized and the particular compound employed. However, in general, satisfactory results are obtained when the compounds are administered at a daily dosage of from about 4 milligrams to 200 milligrams per kilogram of animal body weight. This daily dosage is preferably given in divided doses, e.g., 2 to 4 times a day, or in sustained release form. For most large mammals, the total daily dosage is from about 300 to 3,000 milligrams and dosage forms suitable for internal administration comprise from about 75 milligrams to about 1,500 milligrams of the compound in admixture with a solid or liquid pharmaceutical carrier or diluent.

Tablets and capsules containing the ingredients indicated below may be prepared by conventional techniques and are useful in effecting tranquilization at a dose of one tablet or capsule 2 to 4 times a day.

| Ingredients | Weight (mg) | |
|---|---|---|
| | tablet | capsule |
| 10-chloro-7-methyl-3-(o-chlorophenyl)-5H-S-triazolo[4,3-d][1,4]benzodiazepin-6(7H)-one | 200 | 200 |
| tragacanth | 10 | — |
| lactose | 247.5 | 300 |
| corn starch | 25 | — |
| talcum | 15 | — |
| magnesium stearate | 2.5 | — |
| Total | 500 mg. | 500 mg. |

EXAMPLE 1

10-chloro-7-methyl-3-(o-chlorophenyl)-5H-s-triazolol[4,3-d][1,4]benzodiazepin-6(7H)-one.

A mixture of 2.5 grams of 1,3-dihydro-1-methyl-5-ethoxy-7-chloro-(2H)-1,4-benzodiazepin-2-one and 2 grams of o-chlorobenzoyl hydrazide is refluxed in 100 ml. of diglyme for 7 hours and then stirred at room temperature for 18 hours. The solvent is removed in vacuo and the resulting residue is treated with water, saturated with solid sodium chloride and extracted several times with ethyl acetate. The combined ethyl acetate extracts are washed once with water, dried over anhydrous sodium sulfate, filtered and evaporated in vacuo to give 10-chloro-7-methyl-3-(o-chlorophenyl)-5H-s-triazolo[4,3-d][1,4]benzodiazepin-6(7H)-one m.p. 170°–175°C.

Following the above procedure and using in place of 1,3-dihydro-1-methyl-5-ethoxy-7-chloro-(2H)-1,4-benzodiazepin-2-one an equivalent amount of
a. 1,3-dihydro-5-ethoxy-1,7-dimethyl-(2H)-1,4-benzodiazepin-2-one,
b. 1,3-dihydro-1-methyl-5-ethoxy-(2H)-1,4-benzodiazepin-2-one,
c. 1,3-dihydro-1-methyl-5-ethoxy-7-nitro-(2H)-1,4-benzodiazepin-2-one,
d. 1,3-dihydro-1-methyl-5-ethoxy-7-trifluoromethyl-(2H)-1,4-benzodiazepin-2-one,
e. 1,3-dimethyl-1,3-dihydro-5-ethoxy-7-chloro-(2H)-1,4-benzodiazepin-2-one, or
f. 3-phenyl-1-methyl-1,3-dihydro-5-ethoxy-7-chloro-(2H)-1,4-benzodiazepin-2-one there is obtained
a. 7,10-dimethyl-3-(o-chlorophenyl)-5H-s-triazolo[4,3-d][1,4]benzodiazepin-6(7H)-one,
b. 7-methyl-3-(o-chlorophenyl)-5H-s-triazolo[4,3-d][1,4]benzodiazepin-6 (7H)-one,
c. 7-methyl-10-nitro-3-(o-chlorophenyl)-5H-s-triazolo[4,3-d][1,4]benzodiazepin-6(7H)-one,
d. 7-methyl-10-trifluoromethyl-3-(o-chlorophenyl)-5H-s-triazolo[4,3-d][1,4]benzodiazepin-6(7H)-one,
e. 10-chloro-5,7-dimethyl-3-(o-chlorophenyl)-5H-s-triazolo[4,3-d][1,4]benzodiazepin-6(7H)-one, or
f. 10-chloro-7-methyl-5-phenyl-3-(o-chlorophenyl)-5H-s-triazolo[4,3-d][1,4]benzodiazepin-2-one, respectively.

Also following the above procedure and using in place of o-chlorobenzoyl hydrazide an equivalent amount of 2,6-dichlorobenzoyl hydrazide there is obtained
a. 10-chloro-7-methyl-3-(2,6-dichlorophenyl)-5H-s-triazolo[4,3-d][1,4]benzodiazepin-6(7H)-one.

What is claimed is:

1. A compound of the formula

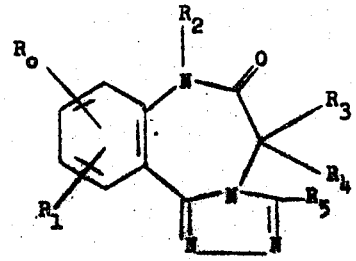

wherein:
$R_0$ and $R_1$ each independently represent hydrogen, halo having an atomic weight of about 18 to 80, alkyl of 1 to 4 carbon atoms, nitro or trifluoromethyl provided that at least one of $R_0$ and $R_1$ is halo, preferably chloro, when $R_2$ is hydrogen, and
$R_2$ is hydrogen, alkyl of 1 to 4 carbon atoms, and
$R_3$ is hydrogen, alkyl of 1 to 4 carbon atoms, unsubstituted phenyl or phenyl mono-substituted with halo having an atomic weight of 18 to 80
$R_4$ is hydrogen, and
$R_5$ is unsubstituted phenyl or phenyl mono-substituted or disubstituted with halo having an atomic weight of 18 to 80, or a pharmaceutically acceptable acid addition salt thereof.

2. A compound of claim 1 in free base form.

3. A compound of the formula

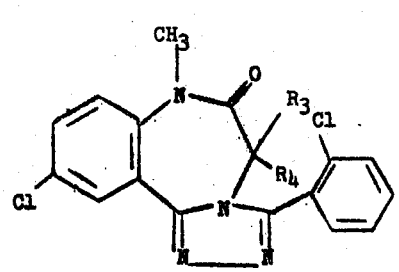

where:
R₃ and R₄ are as defined in claim 1, or a pharmaceutically acceptable acid addition salt thereof.

4. A compound of the formula

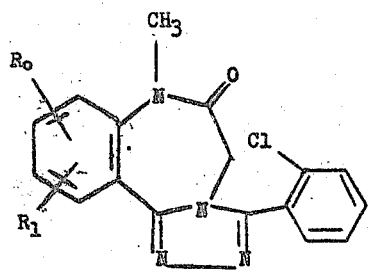

where:
R₀, R₁ and R₂ are as defined in claim 1, or a pharmaceutically acceptable acid addition salt thereof.

5. A compound of the formula

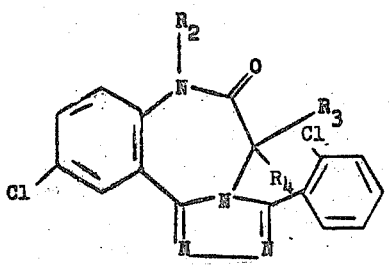

where:
R₂, R₃ and R₄ are as defined in claim 1, or a pharmaceutically acceptable acid addition salt thereof.

6. The compound of claim 1 which is 10-chloro-7-methyl-3-(o-chlorophenyl)-5H-s-triazolo[4,3-d][1,4]benzodiazepin-6(7H)-one.

7. A process for preparing a compound of claim 1 which comprises the step of reacting a compound of the formula

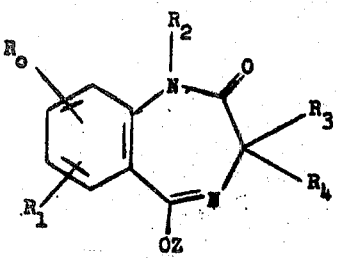

with a compound of the formula

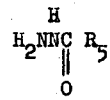

in an inert organic solvent
where
Z represents lower alkyl of 1 to 2 carbon atoms, and
R₀, R₁, R₂, R₃, R₄ and R₅ are as defined in claim 1.

* * * * *